March 14, 1961 J. H. T. WADE 2,974,744
SILENCER
Filed May 12, 1958 2 Sheets-Sheet 1
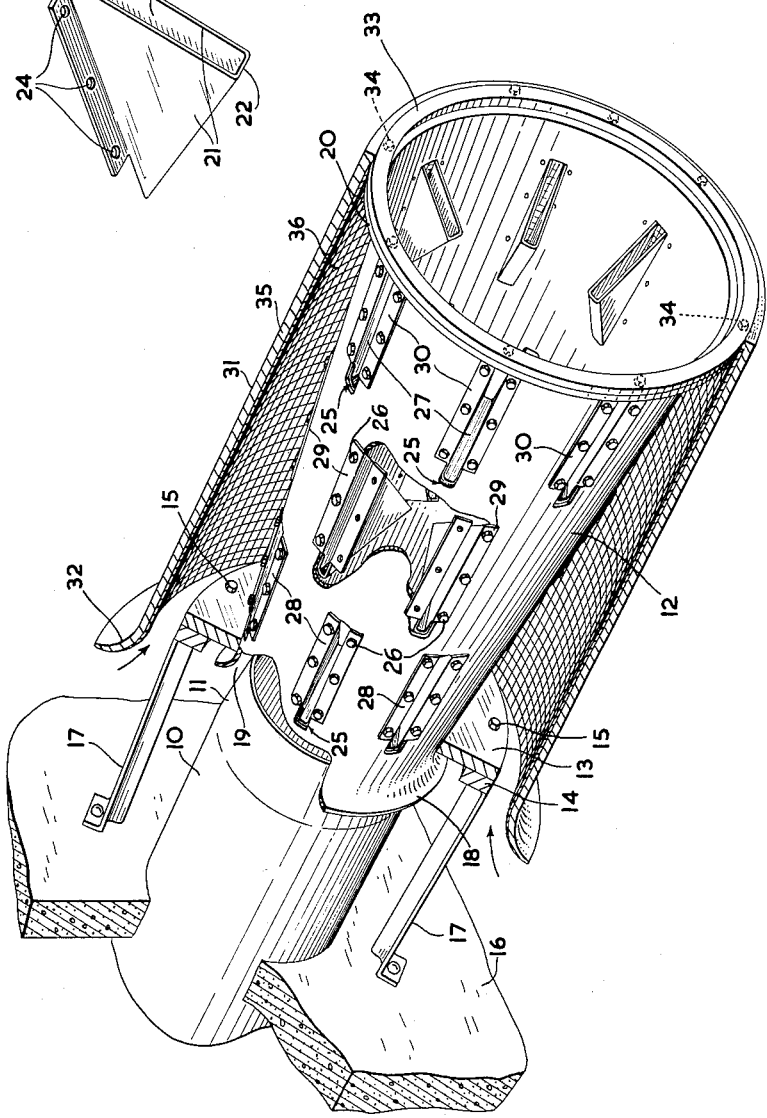
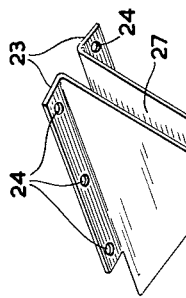
INVENTOR
JOHN H. T. WADE
BY: Maybee & Legris
ATTORNEYS March 14, 1961  J. H. T. WADE  2,974,744
SILENCER
Filed May 12, 1958  2 Sheets-Sheet 2
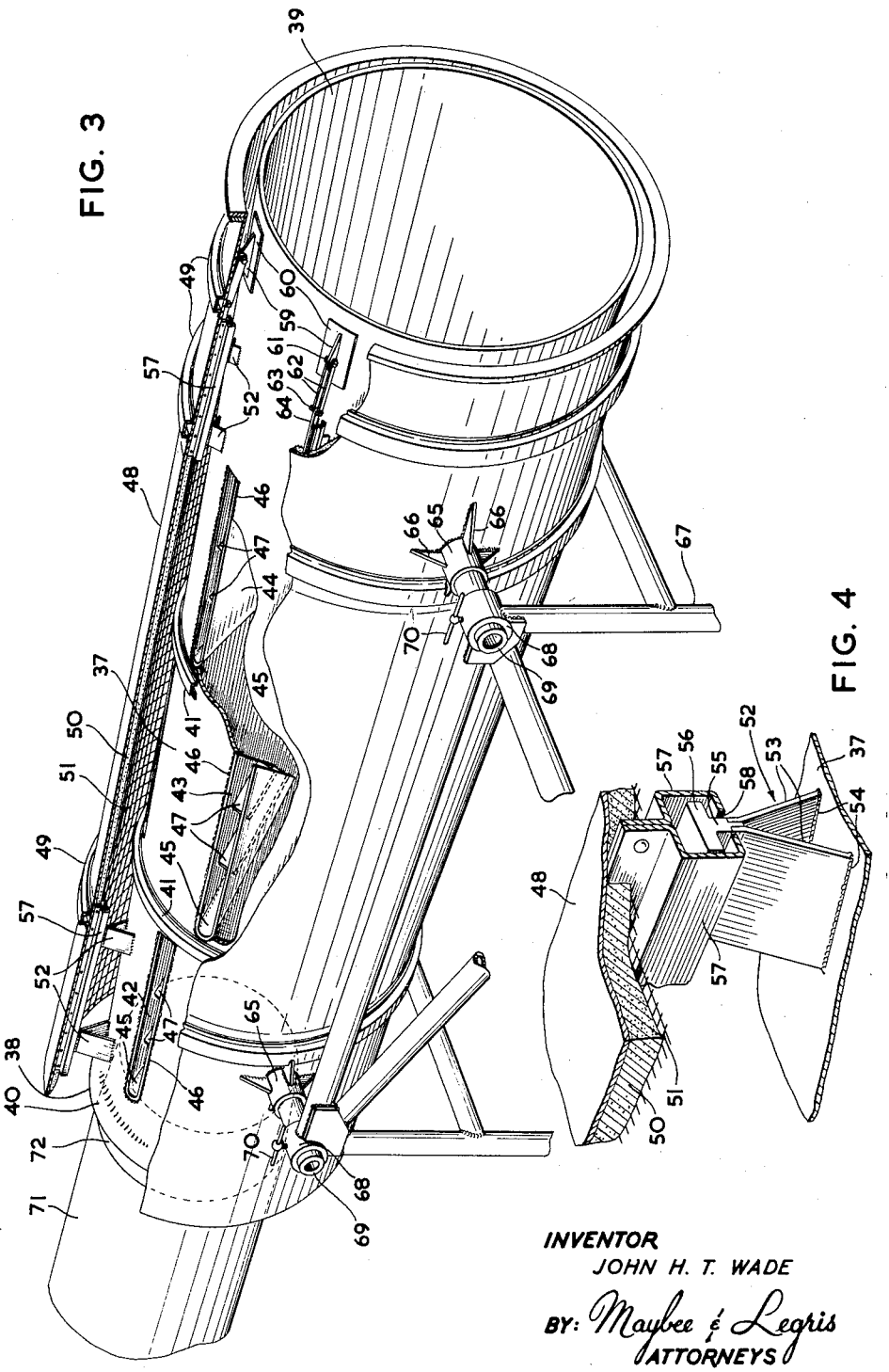
INVENTOR
JOHN H. T. WADE
BY: Maybee & Legris
ATTORNEYS

United States Patent Office 2,974,744
Patented Mar. 14, 1961

2,974,744

SILENCER

John H. T. Wade, Willowdale, Ontario, Canada, assignor to Orenda Engines Limited, Malton Village, Ontario, Canada, a corporation Filed May 12, 1958, Ser. No. 734,654

8 Claims. (Cl. 181—43)

This invention relates to a silencer for attenuating the noise of a high velocity stream of gas issuing from a nozzle. The silencer according to the invention is particularly applicable to the silencing of a gas turbine engine of an aircraft while the engine is being test run with the aircraft on the ground.

A silencer for use with a gas turbine engine has to cause little or no back-pressure on the engine since a back-pressure increases the operating temperatures in the turbine and exhaust system of the engine and prevents the engine from operating at the desired conditions. Moreover, since the noise produced by a gas stream flowing from a nozzle is proportional to the eighth power of the velocity of the gas, the velocity of the stream largely governs the amount of noise produced and must be reduced by the silencer. Furthermore, the exhaust gases of a gas turbine engine have a temperature of the order of 1500 degrees K. At this temperature metal has little strength and this creates a further problem in the design of a silencer for a gas turbine engine.

Although the silencer is particularly applicable to silencing a stream of hot gas, silencers according to the invention may also be used for silencing high velocity streams of cool gas.

It is an object of the present invention to provide a silencer in which the velocity of a gas stream may be considerably reduced without the development of excessive back-pressure.

It is another object of the invention to provide a silencer into which is induced a flow of secondary gas, which may be cooler than the primary gas, to mix with the stream of primary gas and to cool the silencer if the primary gas is hot.

The invention will be described by way of example with reference to the accompanying drawings in which like reference numerals indicate like parts throughout the several views and in which:

Figure 1 is a perspective view, partly cut away, of a silencer according to a first embodiment of the invention, Figure 2 is a detail on a larger scale of one of the baffles of the silencer of Figure 1.

Figure 3 is a perspective view, partly cut away, of a silencer according to a second embodiment of the invention, and Figure 4 is a perspective view of a detail of the silencer of Figure 3.

Referring now to Figures 1 and 2 of the drawings, the silencer shown is suitable for silencing a stream of cool gas and is shown in operative position with a pipe, indicated at 10, which terminates in a convergent nozzle 11. The silencer proper comprises a diffuser tube 12 supported so that, in the operative position shown, the nozzle and the tube have a common longitudinal axis. The diffuser tube 12 is supported by an annular plate 13 to which the inlet end of the tube is welded and by a ring 14 which is bolted to the plate 13 by bolts 15, the ring 14 being supported from standing structure 16 by struts 17.

The inlet end of the diffuser tube is flared outwardly to provide a bell-mouth 18 into which the nozzle 11 discharges a stream of high velocity primary gas. It will be seen that the cross-sectional area of the bell-mouth 18 is greater than the discharge area of the nozzle 11 thus leaving an annular passage 19 between the bell-mouth 18 and the nozzle 11. The diffuser tube increases progressively in cross-sectional area from its inlet end towards its outlet end and terminates at its outlet end in a flange 20.

A plurality of similar baffles project from the inner surface of the diffuser tube into the path of the stream of primary gas. One of the baffles is shown in detail in Figure 2. The baffle has a pair of axial walls 21 and is U-shaped in cross-section, with the closed edge 22 of the U facing upstream. The baffle is triangular in elevation with a flange 23 being formed on each axial wall 21 along the base of the triangle. The flanges 23 are provided with bolt holes 24.

The baffles are mounted in the diffuser tube through apertures 25 in the wall of the tube. The apertures are generally rectangular and correspond in size to the base of a baffle, the baffles are inserted through the apertures from outside the diffuser tube so that the flanges 23 lie on the outside of the tube. The baffles are secured in position on the tube by bolt assemblies 26 passing through the tube and the bolt holes 24. The baffles are located so that the space 27 between the axial walls 21 of each baffle is in alignment with one of the rectangular apertures 25. The axial walls of the baffles project radially into the bore of the tube 12 sufficiently far to enter the stream of primary gas ejected from the nozzle 11. The baffles are arranged in three axially spaced circumferential series, the baffles of one series being out of alignment with the baffles of an adjacent series. Thus, baffles of the first series are indicated generally at 28, baffles of the second series at 29, and baffles of the third series at 30.

A generally cylindrical shroud 31 surrounds the diffuser tube and is provided at its inlet end with a bell-mouth 32. At its other end the shroud is provided with a ring 33 which is secured to the ring 20 by bolt assemblies 34. The shroud is lined with a layer 35 of asbestos or other sound-absorbing material which is retained in place by a steel mesh 36.

The operation of the silencer is as follows: a stream of high velocity primary gas is ejected from the nozzle 11 into the inlet end of the diffuser tube 12 towards the other end thereof. The static pressure of the gas in the tube 10 is higher than atmospheric pressure but decreases to atmospheric pressure at the vena-contracta formed just downstream of the nozzle. The flow of primary gas drags along secondary gas through the annular passage 19 and in so doing decreases its static pressure due to the increase in velocity imparted to the induced secondary gas. The static pressure in the diffuser tube then rises progressively from its reduced value adjacent to the bell-mouth 18 until it is atmospheric at the outlet end of the diffuser tube, so that the static pressure inside the greatest part of the length of the tube is less than atmospheric. Consequently, secondary gas, i.e. atmospheric air, will be induced to flow through the rectangular apertures 25 into the interior of the tube and will flow over the axial walls 21 of the baffles.

The velocity of the high velocity primary gas stream is reduced since the diffuser is made to run substantially full by the blockage presented to the gas flow by the baffles. Axially adjacent baffles are out of alignment, as above described, so as continually to force the gas stream to expand against the side walls of the diffuser tube as the stream passes along the tube. The amount of blockage provided by the baffles is so adjusted that a substantially uniform velocity profile is obtained at the exit plane of the diffuser tube. Moreover, by their shape, the baffles provide considerable turbulence in the gas stream and the dissipation of this turbulence reduces the energy of the gas stream with a consequent reduction of noise.

The shroud 31 serves two purposes; since the velocity of the gas stream in the diffuser tube is subsonic, the noise of the stream is able to propagate in an upstream direction and escape through the apertures 25. The shroud reduces the level of this noise by providing a porous surface, the asbestos layer 35, for its absorption. Moreover, the dead air space separating the diffuser tube and the shroud provides a barrier to the continuous passage of noise from the diffuser tube out through the shroud and provides further attenuation.

If the outlet area of the diffuser tube 12 is twice the cross sectional area at the inlet of the tube, the velocity of the gas stream at the outlet is approximately half of the initial velocity and therefore the sound of the gas jet is appreciably reduced. In a simple diffuser, the maximum angle at which expansion can take place is approximately 8 degrees. If the angle of the diffuser is made to exceed approximately 15 degrees, then the gas stream will not expand to fill the diffuser, resulting in only limited diffusion and in distortion of the velocity profile as the exit plane of the diffuser so that peak velocities are produced which may result in a noise almost as intense as the original gas stream. The silencer of the present invention conveniently has a diffuser tube which has an expansion angle of 11 degrees, although tests show that this angle could be much greater, of the order of 40 degrees. The tube is caused to run full by the blockage provided by the baffles; the blockage being such as to provide a generally uniform velocity profile at the exit plane of the diffuser.

Referring now to Figures 3 and 4, there is shown a second embodiment of the invention designed for use with a high temperature gas stream such as that discharged by an aircraft reaction propulsion unit. The silencer comprises a diffuser tube 37 increasing progressively in cross-sectional area from its inlet end 38 to its outlet end 39. The inlet end of the tube is formed with a bell mouth 40. The tube is strengthened by circumferential, flanged channel members 41 welded in place and the wall of the tube is cut-away to provide substantially rectangular apertures in which are welded baffles. The baffles are arranged circumferentially in three series, the component baffles of each series being aligned axially but being out of register with the baffles in an adjacent series. A baffle of the first series is indicated at 42, a baffle of the second series at 43, and a baffle of the third series at 44. The baffles project radially into the diffuser tube and are U-shaped in cross-section with the closed edge, indicated at 45, of the U facing upstream; the baffles are welded at 46 into the apertures in the wall of the tube 37. Transverse members 47 are welded between the axial walls of the baffles to strengthen them, the members 47 being parallel to the closed edge 45.

The diffuser tube 37 is supported within a generally cylindrical shroud 48 which is strengthened with circumferential flanged channel members 49 welded to the outer surface of the shroud. The shroud is lined with a layer 50 of asbestos, or similar sound absorbent material, which is retained in place by a wire mesh 51.

The tube 37 is supported in the shroud 48 by means which allow for differential expansion between the tube and the shroud. The tube 37 has welded thereto a plurality of support members 52 extending radially from its outer surface. The support members are arranged in pairs, the support members of each pair being aligned axially and there being eight pairs equally spaced round the periphery of the tube near the inlet end thereof and the further eight pairs equally spaced round the tube near the exit end thereof. Referring now to Figure 4, it will be seen that each support member 52 comprises a pair of inclined plates 53 welded at 54 to the tube 37. Each pair of plates 53 supports a T-section member 55 which provides a transverse flange 56. A pair of bent plates 57 welded to the interior surface of the shroud 48 provide a box section guide track which is slotted at 58, a guide track being provided for each pair of support members. The transverse flange 56 is received within the box section guide track with the vertical portion of the T-shaped member 55 passing through the slot 58.

It will be seen that the T-shaped member 55 is free to slide axially in the box section guide track constituted by the plates 57 and is also free to move radially. This arrangement at both the inlet and outlet ends of the tube 37 allows the tube to move relatively to the shroud to accommodate differential thermal expansion.

On the outer surface of the tube 37, adjacent to the outlet end thereof, a plurality of upstanding lugs is welded; two of the lugs are indicated at 59 and are provided with base plates 60. To each lug 59 is pivotally connected, at 61, a pair of links 62 which, at their other ends, are pivotally connected at 63 to a bar 64. The bars 64 are received between the plates 57 of the box section guide tracks adjacent to the exit end of the tube. The pivoted links 62 locate the diffuser tube 37 within the shroud while allowing for differential expansion.

The exterior of the shroud is provided with four trunnion members, two of which are shown at 65, which are welded to the shroud and are supported by fillets 66. The silencer is carrier by a tubular framework 67 which is provided with trunnion members 68 arranged to align with the trunnion members 65. Supporting tubes 69 pass through the trunnions 68 into the trunnions 65 and are clamped in place by screws 70. The framework is provided with wheels, not shown, so that the silencer may be wheeled up to an aircraft.

The silencer is shown in operative position adjacent to a pipe 71, which may be the jet pipe of a reaction propulsion unit, which terminates in a convergent nozzle 72. The cross-sectional area of the bell mouth 40 is larger than the discharge area of the convergent nozzle 72 whereby an annular passage is left between the exterior of the nozzle and the interior of the bell mouth 40.

Operation of the embodiment in Figures 3 and 4 is the same as that of the embodiment of Figures 1 and 2. Hot high velocity primary gas issues from the nozzle 72 into the diffuser tube 37 and drags with it atmospheric air through the annular passage between the bell mouth 40 and the nozzle 72. The velocity imparted to the atmospheric air decreases the static pressure of the gas in the diffuser tube whereby further atmospheric air flows between the diffuser tube and the shroud, through the apertures, and over the baffles. The air flowing over the baffles cools them so that they have a reasonably long service life; this would not be the case if they were not cooled. The arrangement by which the diffuser tube is supported within the shroud permits the diffuser tube to expand relatively to the shroud without straining any joints.

As in the previous embodiment, the angle of the diffuser tube is conveniently about 11° although a greater angle, of the order of 40°, can be used if desired.

It is essential for the operation of the silencer that the baffles project into the primary gas stream ejected from the nozzle to force the gas stream against the sidewalls of the diffuser tube and, hence, to decrease its velocity. It is also essential that the inlet area of the diffuser tube be greater than the cross-sectional area of the exit plane of the nozzle so that a secondary air flow may be induced.

The invention provides a compact and light weight silencer which may be easily brought into position adjacent to the nozzle of an aircraft engine mounted in an aircraft on the ground. Heretofore, for the efficient silencing of jet engines, it has been necessary to build a substantial standing structure and to position the aircraft adjacent to the structure so that the jets produced are directed into the structure.

Moreover, due to the large diffuser angle which may be used the silencer may be made relatively short without sacrificing efficiency.

It will be understood that the form of the invention herewith shown and described is a preferred example and various modifications can be carried out without departing from the spirit of the invention or the scope of the appended claims.

What I claim as my invention is:

1. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, the wall of the tube having a series of apertures, the apertures and the one end of the tube being open, during operation of the silencer, to a source of secondary gas at a static pressure higher than the static pressure of the primary gas after it has entered the diffuser tube, a plurality of baffles, one associated with each aperture and projecting from the wall of the tube into the path of the stream of primary gas, each baffle constituting a duct having an inlet in a plane parallel to the wall of the tube and in registry with one of the apertures in the said wall and an outlet in a plane generally transverse to the axis of the tube and lying substantially along a radius of the tube, the difference between said static pressures inducing a flow of secondary gas to mix with the primary gas, the secondary gas flowing through the apertures and the baffles and into the interior of the stream of primary gas, the baffles causing sufficient blockage for the tube to be substantially filled during operation by the flow of gas.

2. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, the wall of the tube at said one end being flared outwardly and, in operative position, being in overlapping relationship to the nozzle so that the opposing walls of the nozzle and the end of the tube define an annular intake passage, the wall of the tube having a series of apertures, the apertures and the intake passage being open, during operation of the silencer, to a source of secondary gas at a static pressure higher than the static pressure of the primary gas after it has entered the diffuser tube, a plurality of baffles, one associated with each aperture and projecting from the wall of the tube into the path of the stream of primary gas, each baffle constituting a duct having an inlet in a plane parallel to the wall of the tube and in registry with one of the apertures in the said wall and an outlet in a plane generally transverse to the axis of the tube and lying substantially along a radius of the tube, the difference between said static pressures inducing a flow of secondary gas to mix with the primary gas, the secondary gas flowing through the apertures and the baffles and into the interior of the stream of primary gas, the baffles causing sufficient blockage for the tube to be substantially filled by the flow of gas during operation.

3. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, a plurality of baffles projecting radially from the inner wall of the tube into the path of the stream of primary gas, the baffles being U-shaped in cross-section and the limbs of the U lying parallel to the axis to provide axial walls, the closed edge of the U facing upstream, the baffles being generally triangular in elevation with the base of the triangle lying along the inner wall of the tube, the tube having a series of generally rectangular apertures in its wall in alignment with the spaces between the axial walls of the baffles, the apertures and the one end of the tube being open, during operation of the silencer, to a source of secondary gas at a static pressure higher than the static pressure of the primary gas after it has entered the diffuser tube, the difference between said static pressures inducing a flow of secondary gas to mix with the primary gas, the secondary gas flowing through the apertures and the baffles into the interior of the primary gas stream, the baffles causing sufficient blockage for the tube to be substantially filled during operation by the flow of gas.

4. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end therof, the tube increasing in cross-sectional area from said one end towards said other end and the cross-sectional area of the one end of the tube being greater than the discharge area of the nozzle, a plurality of baffles projecting radially from the inner wall of the tube into the path of the stream of primary gas, the baffles being U-shaped in cross-section with the limbs of the U lying parallel to the axis to provide axial walls and the closed end of the U facing upstream, the baffles being triangular in elevation with the base of the triangle lying along the inner wall of the tube, the tube having a series of generally rectangular apertures in its wall, in alignment with the spaces between the axial walls of the baffles, a generally cylindrical shroud surrounding the diffuser tube in spaced relation thereto, and a lining of sound absorbing material on the inner surface of the shroud, the apertures and the one end of the tube being open, during operation of the silencer, to a source of secondary gas at a static pressure higher than the static pressure of the primary gas after it has entered the diffuser tube, the difference between said static pressures inducing a flow of secondary gas to mix with the primary gas, the secondary gas flowing through the apertures and the baffles and into the interior of the primary gas stream, the baffles causing sufficient blockage for the tube to be substantially filled during operation by the flow of gas.

5. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, a plurality of baffles projecting from the inner wall of the tube into the path of the stream of primary gas, the tube having a series of apertures in its wall adjacent to the baffles, a shroud surrounding the diffuser tube in spaced relation thereto, and means mounting the tube within the shroud to permit the tube to move axially and radially relatively to the shroud, the apertures and the one end of the tube being open, during operation of the silencer, to a source of secondary gas at a static pressure higher than the static pressure of the primary gas after it has entered the diffuser tube, the difference between said static pressures inducing a flow of secondary gas to mix with the primary gas, the secondary gas flowing through the apertures and the baffles and into the interior of the primary gas stream, the baffles causing sufficient blockage for the tube to be substantially filled during operation by the flow of gas.

6. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, a plurality of baffles projecting from the inner wall of the tube into the path of the stream of primary gas, the tube having a series of apertures in its wall adjacent the baffles, a shroud surrounding the diffuser tube in spaced relation thereto, a plurality of radially extending support members on the exterior of the diffuser tube, and guide tracks on the shroud to receive the free ends of said support members, the free ends of the support members being received in said guide tracks with clearance to permit the diffuser tube to move radially and axially relatively to the shroud, the apertures and the one end of the tube being open, during operation of the silencer, to a source of secondary gas at a static pressure higher than the static pressure of the primary gas after it has entered the diffuser tube, the differences between said static pressures inducing a flow of secondary gas to mix with the primary gas, the secondary gas flowing through the apertures and the baffles and into the interior of the stream of primary gas, the baffles causing sufficient blockage for the tube to be substantially filled during operation by the flow of gas.

7. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, a plurality of baffles projecting from the inner wall of the tube into the path of the stream of primary gas, the tube having a series of apertures in its wall adjacent to the baffles, a shroud surrounding the diffuser tube in spaced relation thereto, a plurality of support members radially extending from the outer surface of the diffuser tube, a transverse flange at the free end of each of said support members, and slottted box section guide tracks on the inner surface of the shroud to receive the free ends of the support members, the transverse flange of each support member being received within a box section guide track and the support member passing through the slot in said guide track, the support members and flanges fitting within the guide tracks with clearance to permit the diffuser tube to move radially and axially relatively to the shroud, the apertures and the one end of the tube being open, during operation of the silencer, to a source of secondary gas at a static pressure higher than the static pressure of the primary gas after it has entered the diffuser tube, the difference between said static pressures inducing a flow of secondary gas to mix with the primary gas, the secondary gas flowing through the apertures and the baffles and into the interior of the stream of primary gas, the baffles causing sufficient blockage for the tube to be substantially filled during operation by the flow of gas.

8. A silencer for attenuating the noise of a high velocity stream of primary gas issuing from a nozzle, the silencer comprising a diffuser tube arranged to be operatively positioned relatively to the nozzle so that the nozzle and the tube have a common longitudinal axis, the nozzle directing the gas stream from one end of the tube towards the other end thereof, the tube increasing in cross-sectional area from said one end towards said other end and the cross-sectional area of the one end of the tube being greater than the discharge area of the nozzle, the wall of the tube at said one end being flared outwardly, and, in operative position, being in overlapping relationship to the nozzle so that the mutually opposing walls of the nozzle and the end of the tube define an annular intake passage, a plurality of baffles projecting radially from the inner wall of the tube into the path of the stream of primary gas, the baffles being U-shaped in cross-section with the limbs of the U lying parallel to said axis to provide axial walls and with the closed edge of the U facing upstream, the baffles being triangular in elevation with the base of the triangle lying along the inner wall of the tube, the tube having a series of generally rectangular apertures in its wall in alignment with the spaces between the axial walls of the baffles, a generally cylindrical shroud surrounding the diffuser tube in spaced relationship thereto, a lining of sound absorbing material on the inner surface of the shroud, a plurality of support members extending radially from the outer surface of the diffuser tube, a transverse flange at the free end of each support member, slotted box-section guide tracks on the shroud, the free ends of the support members being received in said tracks, the flange being within said box-section and the support member passing through the slot therein, the free ends of the support members fitting within said tracks with clearance to permit axial and a radial movement of the diffuser tube relatively to the shroud, and links pivotally secured at one end to the diffuser tube and at the other end to the shroud, the apertures and said intake passage being open, during operation of the silencer, to a source of a secondary gas at a static pressure higher than the static pressure of the primary gas after it has entered the diffuser tube, the difference between said static pressures inducing a flow of secondary gas to mix with the primary gas, the secondary gas flowing through the apertures and the baffles and into the interior of the stream of primary gas, the baffles causing sufficient blockage for the tube to be substantially filled during operation by the flow of gas.

References Cited in the file of this patent

UNITED STATES PATENTS

| | | |
|---|---|---|
| 2,586,788 | Cushman | Feb. 26, 1952 |
| 2,685,936 | Brenneman et al. | Aug. 10, 1954 |

FOREIGN PATENTS

| | | |
|---|---|---|
| 202,293 | Australia | July 5, 1956 |